United States Patent [19]
Sako

[11] Patent Number: 5,963,649
[45] Date of Patent: Oct. 5, 1999

[54] MESSAGE AUTHORIZATION SYSTEM FOR AUTHORIZING MESSAGE FOR ELECTRONIC DOCUMENT

[75] Inventor: Kazue Sako, Tokyo, Japan

[73] Assignee: NEC Corporation, Tokyo, Japan

[21] Appl. No.: 08/767,633

[22] Filed: Dec. 17, 1996

[30] Foreign Application Priority Data

Dec. 19, 1995 [JP] Japan ..................................... 7-348861
Jan. 17, 1996 [JP] Japan ..................................... 8-005489

[51] Int. Cl.$^6$ .............................. H04L 9/32; H04L 9/30; H04L 9/00
[52] U.S. Cl. ............................... 380/25; 380/23; 380/30; 380/49; 380/59
[58] Field of Search ................................. 380/23, 25, 30, 380/49, 50, 59

[56] References Cited

U.S. PATENT DOCUMENTS

| | | | |
|---|---|---|---|
| 4,625,076 | 11/1986 | Okamoto et al. ........................ | 380/23 |
| 5,719,940 | 2/1998 | Ahn et al. ................................ | 380/25 |

FOREIGN PATENT DOCUMENTS

| | | |
|---|---|---|
| 2-170184 | 6/1990 | Japan . |
| 4-237087 | 8/1992 | Japan . |
| 5-333777 | 12/1993 | Japan . |
| 7-261663 | 10/1995 | Japan . |
| 7-287515 | 10/1995 | Japan . |

OTHER PUBLICATIONS

Okamoto et al., "How to Utilize the Randomness of Zero-Knowledge Proofs", NTT Communications and Information Processing Laboratories, pp. 456–475, No Date.

Fiat et al., "How to Prove Yourself: Practical Solutions to Identification and Signature Problems" Department of Applied Mathematics, The Weizmann Institute of Science, pp. 187–194, No Date.

Brassard et al., "Minimum Disclosure Proofs of Knowledge", Journal of Computer and System Sciences, vol. 37, No. 2, (1988), pp. 156–189.

Markus Jakobsson et al., "Designated Verifier Proofs and Their Application," Lecture Notes in Computer Science 1070, Advances in Cryptology—EUROCRYPT '96, International Conference on the Theory and Application of Cryptographic Techniques, Saragossa, Spain, May 1996 Proceedings, pp. 143–154.

Primary Examiner—Bernarr E. Gregory
Attorney, Agent, or Firm—Foley & Lardner

[57] ABSTRACT

A message authorization system in which a sender sub-system and a verifier sub-system each have inherent secret information and inherent public information set corresponding to the secret information, the sender sub-system including an authorization data producing unit for producing authorization data dependent on the public information of the verifier sub-system and the secret information of the sender sub-system, and the verifier sub-system including a data verification unit for verifying authorization data received jointly with an electronic document from the sender sub-system based on the public information of the sender sub-system.

14 Claims, 9 Drawing Sheets

MESSAGE AUTHORIZATION SYSTEM FOR AUTHORIZING MESSAGE FOR ELECTRONIC DOCUMENT

BACKGROUND OF THE INVENTION

1. Field of the Invention

The present invention relates to a message authorization system for authorizing a message for an electronic document and, more particularly, to a message authorization system which enables designation of a verifier of authorization data without communication between a verifier and a sender. The invention also relates to a message authorization system for signing an electronic document using such a message authorization system.

2. Description of the Related Art

Message authentication is used by a sender for disclosing an electronic document only to a specific verifier. Message authentication is different from common digital signature by which anyone can verify signature data in that a sender can limit a verifier and that even if a verifier transfers authentication data for reading an electronic document in question to a third party, the third party is incapable of verifying the authentication data.

Typical message authentication system is disclosed, for example, in Eiji Okamoto, Introduction to Cryptography Theory, Kyoritsu Publishing Company, on pages 129 to 131. According to the literature, a sender and a verifier share an encryption key K in advance and the sender sends a hash value produced from a message and the encryption key K as authentication data together with the message. The verifier calculates a hash value from the received message and the shared encryption key K in the same manner and if the result is equal to the received authentication data, the verifier accepts the data as right authentication data. Even if the authentication data is transferred to a third party, the third party can not distinguish right data which is authorized by a sender from authentication data produced by the verifier by himself and can not verify the authentication data accordingly.

As a method of realizing message authentication without sharing of an encryption key between a sender and a verifier in advance, there is a method disclosed in "How to Utilize Randomness of Zero-Knowledge Proofs" (Okamoto and Ohta, Lecture Notes in Computer Science 537, Advances in Cryptology-CryPto '90, Springer-Verlag, pp. 456–475). The message authentication system recited in the literature realizes message authentication by combining a value obtained from a message with a random number information component in a personal authentication protocol of a sender employing zero-knowledge proofs.

In the above-described conventional message authentication, when employing a system in which a common key is shared in advance, however, flexibility of the system is diminished because a sender and a verifier should share a common key. In addition, communication between a sender and a verifier for setting a common key is required, which makes procedure troublesome.

In a system employing zero-knowledge proofs, personal authentication protocol should be interactively conducted and communication between a sender and a verifier is required accordingly, making procedure troublesome.

Non-interactive execution of personal authentication protocol is recited in the literature "How to Prove Yourself: Practical Solutions to Identification and Signature Problems" (Fiat and Shamir, Advances in Cryptology-Crypto 86, pp. 186–199). Fiat-Shamir system, however, has a drawback that transmitted data, like digital signature, can be verified by anyone.

It is therefore needed to realize a message authentication system which can limit a verifier simply by sending authentication data from a sender to the verifier without communication between them.

For digital signature, an undeniable signing method is proposed which allows a signer to limit a verifier. Unlike common digital signature, undeniable signature is non-divertible, which enables a signer to limit a verifier. Among conventional undeniable signing methods are that proposed by Chaum, that disclosed in Japanese Patent Laying Open (Kokai) No. Heisei 4-237087, entitled "Digital Signing System" and No. Heisei 5-333777, entitled "Digital Signing System". According to these methods, verifier inquires mode of verifying a signature and communicates with a signer to conduct verification. Acceptance or denial of the inquiry by the signer enables selection of a verifier.

According to the digital signing method recited in Japanese Patent Laying Open (Kokai) No. Heisei 4-237087, for example, there is such public information produced by using common information "p" and "g" and a key "x" for signing as follows:

$$y = g^{x} \bmod p \tag{1}$$

and signature data "s" will be produced according to the following expression.

$$s \: mx \bmod p \tag{2}$$

For verifying the above data, a verifier and a signer communicate in a manner as described in the following. First, the signer produces the expressions set forth below by using a random number "r" and sends them to the verifier.

$$X1 = gr \bmod p \tag{3}$$

$$X2 = mr \bmod p \tag{4}$$

On the other hand, the verifier sends a random number "e". The signer creates a communication document set forth below and sends the document to the verifier.

$$Y = r + e \cdot x \tag{5}$$

The verifier conducts verification according to the following expressions.

$$X1^{Y} = y^{e} \cdot g^{r} \bmod p \tag{6}$$

$$X2^{Y} = s^{e} \cdot m^{r} \bmod p \tag{7}$$

According to the digital signing method recited in Japanese Patent Laying Open (Kokai) No. Heisei 5-333777, a signer opens to the public a graph "g" with a key for signing as a Hamilton closed circuit, produces a signature "s" having a Hamilton closed circuit "h" from messages "m", "g" and "h" and transmits the message "m" and the signature "s" to a verifier. The verifier sends the message "m", the signature "s" ad a random number {c} to the signer. Next, the signer calculates graphs "a"=π(g) and "b"=π(s) by substitution π, makes the graphs into cryptograms using the random number {c} and sends the cryptograms as "X1", "X2" and "X3" to the verifier. The verifier further sends a random number "q" to the singer. The signer sends the information of "X1", "X2" and "X3" as "Y" to the verifier when "q"=0 in an information presentation device. When "q"=1, if the signature "s" is right, the signer sends, as "Y", information used for a closed circuit π(h) for the graph "a" and the information used for the closed circuit π(h) for the graph "b" to the verifier. When the signature "s" is not right, the signer sends to the verifier, as "Y", the encryption information for the graph "a" and the encryption information of a part of the encryption information for the graph "b" which part is different from the encryption information for the graph "a". The verifier verifies the message "m" and the signature "s" based on "Y", "X1", "X2", "X3" and the random number "q".

The above-described conventional digital signing method, as well as conventional message authentication system, requires communication between a signer and a verifier at the time of verification of a signature of the signer by the verifier, making procedure troublesome.

When verifying a signature by one-way data communication from a signer to a verifier according to the Fiat-Shamir system in order to avoid communication between a signer and a verifier, verification data becomes equal to ordinary digital signature indicating that verification data is universally right or not, hurting non-divertibility of an undeniable signature.

It is therefore needed to realize an undeniable signing method which allows a signer to limit a verifier by simply transmitting verification data from the signer to the verifier without communication between them, that is, to realize a non-divertible digital signing system.

SUMMARY OF THE INVENTION

A first object of the present invention is to provide a message authorization system realizing message authorization in which a verifier is designated simply through sending of verification data from a sender to a verifier without communication between them, thereby preventing the message authorization from being diverted by a third party.

A second object of the present invention is to provide a message authorization system realizing digital signature in which system a verifier is designated simply through sending of verification data from a signer to a verifier without communication between them, thereby preventing the digital signature from being diverted by a third party.

According to one aspect of the invention, a message authorization system for conducting message authorization by adding authorization data to an electronic document sent from a sender sub-system to a verifier sub-system such that said verifier sub-system ascertains the validity of said authorization data, the sender sub-system and said verifier sub-system each having inherent secret information and inherent public information set corresponding to the secret information, the sender sub-system including authorization data producing means for producing said authorization data dependent on the public information of said verifier sub-system and the secret information of said sender sub-system, and the verifier sub-system including data verifying means for verifying said authorization data received from said sender sub-system jointly with said electronic document based on the public information of said sender sub-system.

In the preferred construction, the authorization data producing means of said sender sub-system produces a chameleon commitment dependent on the public information of said verifier sub-system and produces said authorization data based on the chameleon commitment, and the data verifying means of said verifier sub-system verifies said authorization data based on a chameleon commitment included in said authorization data.

In the preferred construction, the said authorization data producing means of said sender sub-system comprises first data producing means for producing first partial authorization data based on the public information and an arbitrary random number of said sender sub-system, chameleon commitment producing means for producing a chameleon commitment based on said first partial authorization data, the public information of said verifier and an arbitrary random number of said sender sub-system, challenge producing means for producing a challenge based on said chameleon commitment, and second data producing means for producing second partial authorization data based on said challenge and the secret information of said sender sub-system, and the authorization data producing means sends said chameleon commitment, said second partial authorization data and the value of said random number used in the production of said chameleon data, as authorization data, to said verifier sub-system, and the data verifying means of said verifier sub-system comprises chameleon commitment restoring means for restoring said first partial authorization data based on the public information of said verifier sub-system, and said chameleon commitment and said random number value included in said received authorization data, challenge restoring means for restoring said challenge based on said chameleon commitment, and data ascertaining means for verifying said authorization data based on said restored challenge, said restored first partial authorization data, said second partial authorization data and the public information of said sender sub-system.

In another preferred embodiment, the public information of the sender sub-system and the public information of said verifier sub-system are open to the public by a predetermined means so as to be accessible irrespective of transmission sending and reception of said electronic document and said authorization data, the authorization data producing means of said sender sub-system produces a chameleon commitment dependent on the public information of said verifier sub-system and produces said authorization data based on the chameleon commitment, and the data verifying means of said verifier sub-system verifies said authorization data based on the chameleon commitment included in said authorization data.

In another preferred embodiment, the public information of said sender sub-system and the public information of said verifier sub-system are open to the public by a predetermined means so as to be accessible irrespective of transmission and reception of said electronic document and said authorization data, the authorization data producing means of said sender sub-system comprises first data producing means for producing first partial authorization data based on the public information and an arbitrary random number of said sender sub-system, chameleon commitment producing means for producing a chameleon commitment based on said first partial authorization data, the public information of said verifier and an arbitrary random number of said sender sub-system, challenge producing means for producing a challenge based on said chameleon commitment, and second data producing means for producing second partial authorization data based on said challenge and the secret information of said sender sub-system, and the authorization data producing means sends said chameleon commitment, said second partial authorization data and the value of said random number used in the production of said chameleon data, as authorization data, to said verifier sub-system, and the data verifying means of said verifier sub-system comprises chameleon commitment restoring means for restoring said first partial authorization data based on the public information of said verifier sub-system, and said chameleon commitment and said random number value included in said received authorization data, challenge restoring means for restoring said challenge based on said chameleon commitment, and data ascertaining means for verifying said authorization data based on said restored challenge, said restored first partial authorization data, said second partial authorization data and the public information of said sender sub-system.

According to another aspect of the invention, a digital signing system for implementing signing by adding signature data to an electronic document sent from a sender sub-system to a verifier sub-system, the sender sub-system and said verifier sub-system each having inherent secret information and inherent public information set corresponding to the secret information, the sender sub-system comprises signature data producing means for producing signature data dependent on the secret information of said sender, and verification data producing means for producing said verification data dependent on the public information of said verifier sub-system and the secret information of said sender sub-system, and the verifier sub-system comprises data verifying means for verifying said signature data applied to said electronic document based on said verification data received jointly with said electronic document from said sender sub-system and the public information of said sender sub-system.

In the above-mentioned embodiment, the verification data producing means of said sender sub-system produces a chameleon commitment dependent on the public information of said verifier sub-system and produces said verification data based on the chameleon commitment, and the data verifying means of said verifier sub-system restores predetermined information based on a chameleon commitment included in said verification data and verifies said signature data based on the restored information, said verification data and the public information of said sender sub-system.

In the preferred embodiment, the public information of said sender sub-system and the public information of said verifier sub-system are open to the public by a predetermined means so as to be accessible irrespective of transmission and reception of said electronic document with said signature data applied, the verification data producing means of said sender sub-system produces a chameleon commitment dependent on the public information of said verifier sub-system and produces said verification data based on the chameleon commitment, and the data verifying means of said verifier sub-system restores predetermined information based on the chameleon commitment included in said verification data and verifies said signature data based on the restored information, said verification data, and the public information of said sender sub-system.

In another preferred embodiment, the public information of said sender sub-system and the public information of said verifier sub-system are open to the public by a predetermined means so as to be accessible irrespective of transmission and reception of said electronic document with said signature data applied, the verification data producing means of said sender sub-system comprises chameleon commitment producing means for producing a chameleon commitment based on the public information of said verifier, arbitrary random number and random number bit of said sender sub-sytem, first data producing means for producing first partial verification data based on the public information and an arbitrary random number of said sender sub-system, a challenge producing means for producing a challenge based on said chameleon commitment and said first partial verification data, and second data producing means for producing second partial verification data based on said challenge and the secret information of said sender sub-system, and the verification data producing means sends said chameleon commitment, said first partial verification data, said second partial verification data and the value of said random number used in the production of said chameleon data, as verification data, to said verifier sub-system, and the data verifying means of said verifier sub-system comprises chameleon commitment restoring means for restoring a random number bit based on the public information of said verifier sub-system, and said chameleon commitment and said random number value included in said received authorization data, challenge restoring means for restoring said challenge based on said restored random number bit, said chameleon commitment, and said first partial authorization data, and data ascertaining means for verifying said signature data based on said restored challenge, said first and second partial authorization data and the public information of said sender.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to limit to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Outline of the present invention will be described first.

Figure 9:
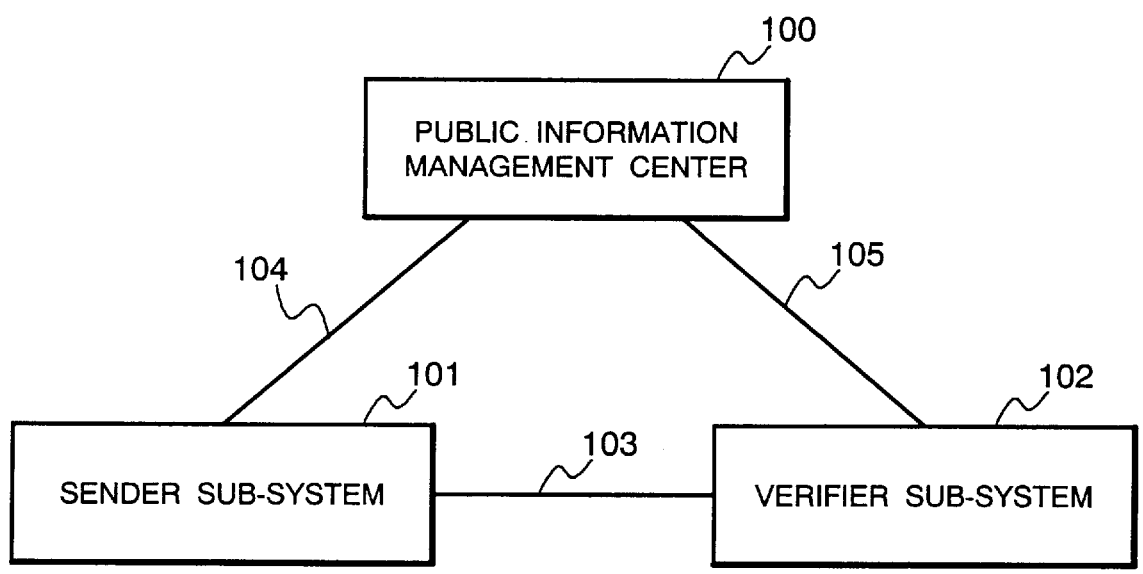
FIG. 9 is a schematic diagram showing structure of an information communication system in which the present invention is employed.

The present invention, as shown in FIG. 9, is assumed to be a message authorization system for use in an information communication system in which a sender sub-system 101, a verifier sub-system 102 and a public information management center 100 are connected via a communication channel. In the figure, the sender sub-system 101 and the verifier sub-system 102 are linked with each other via a reliable communication channel (e.g. data line) 103. The public information management center 100 manages public information, such as a public key, of the sender sub-system 101 and the verifier sub-system 102, so that the sender sub-system 101 and the verifier sub-system 102 can obtain the other party's public information from the public information management center 100 through reliable communication channels 104 and 105, respectively. As long as reliable reception and transmission of public information is possible between the sender sub-system 101 and the verifier sub-system 102, the public information management center 100 is not always an indispensable component. The communication channels 103, 104 and 105 are preferably unsusceptible to noise for the accurate communication of information and hard for a third party to intercept and alter information being communicated. In the following description, the public information management center 100, the sender sub-system 101 and the verifier sub-system 102 will be suitably referred to as the center 100, the sender 101 and the verifier 102, respectively, for the purpose of simplicity.

In the present invention, when producing verification data, the sender 101 uses public information inherent to the verifier 102. Since the public information of the verifier 102 is opened to the public, communication between the sender and the verifier is unnecessary to obtain it. In addition, use of public information of the verifier 102 enables distinction between the verifier 102 holding secret information corresponding to the public information and a third party not having the secret information, thereby realizing a system for authorizing a message which can not be verified by a third party.

Furthermore, at the time of producing verification data, the present invention utilizes chameleon commitment produced using public information inherent to the verifier 102. Since chameleon commitment is produced also by using public information, communication between two parties is unnecessary for producing it. Use of chameleon commitment results in having authorization data different from one another in nature, data which is sent to a verifier 102 from a sender 101 who knows none of the secret information, such as a public key, corresponding to the public information of the verifier 102, and data which is transferred from the verifier 102 who knows the secret information in question to a third party. This is because chameleon commitment enables the verifier 102 who knows his own secret information to produce false consistent authorization data at will, while enabling the sender 101 who knows none of the secret information of the verifier 102 to produce only right authorization data. As a result, verification results using the authorization data produced by the sender 101 are reliable, but the verification results are unreliable for a third party because authorization data transferred from the verifier 102 might be false. The third party therefore can not verify transferred authorization data, which leads to the restriction of a verifier.

Chameleon commitment is recited in, for example, the literature "Minimum Disclosure Proofs of Knowledge" (Brassard, Chaum and Crepeau, Journal of Computer and System Science, pages 156–189). As a simple example, one-bit chameleon commitment between a sender and a receiver will be described. Chameleon commitment is a system in which a sender sends data to a receiver after accurately encoding the code "0" or "1" into (u,r) by using a public key of the receiver. This system is characterized in that a receiver knowing a secret key is capable of inverse coding (u,r') by using the same "u".

First, a sender generates a random number bit "b" and a random number "r" by a random number generator, produces "u" according to the following equation and sends (u,r) to a receiver, where "y", "a" and "p" are public information of the receiver and mod p is a reminder of the division by "p".

$$u = y^b \cdot a^r \bmod p \tag{8}$$

The receiver holds in secret the public information "y", "a" and "p" and a secret key x which has the following relationship.

$$y = a^x \bmod p \tag{9}$$

When the result of $u/a^r \bmod p$ is equal to "1", the receiver restores "b" to 0 and when the result is equal to "y", it restores "b" to 1. In this case, proper restoration is conducted.

Description will be next given of a method of inversely restoring a chameleon commitment by a receiver knowing a secret key, on the assumption that the receiver receives "r" sent from a sender and knows "x" which satisfies the expression $y = a^x \bmod p$.

At this time, the receiver first accurately restores "b" to 0 when the result of $u/a^r \bmod p$ is equal to "1" and restores "b" to 1 when the result is equal to "y". As a result, when "b" is 0, the receiver sets "r'"=r−x and when "b" is equal to 1, it sets "r'"=r+x.

The receiver thus sends (u, r') to a third party. Based on (u, r'), the third party restores "b'" to 0 when the result of u/a^{r'} mod p is equal to "1" and when the result is equal to "y", restores "b'" to 1. At this time, "b" and "b'" always take on values opposite to each other.

As described in the foregoing, while only one type of "b" can be restored from (u, r) sent from the sender, the receiver is capable of producing a pair (u, r) which enables restoration of both right "b" and false "b" by using the secret key "x". Since a third party is not capable of distinguishing between (u, r') operated by the receiver and (u, r) not operated by him, data from the receiver is not reliable.

In addition to those described above, many implementations of the chameleon commitments are recited in the above literatures.

Preferred embodiments of the present invention will be described in detail with reference to the accompanying drawings.

Figure 1:
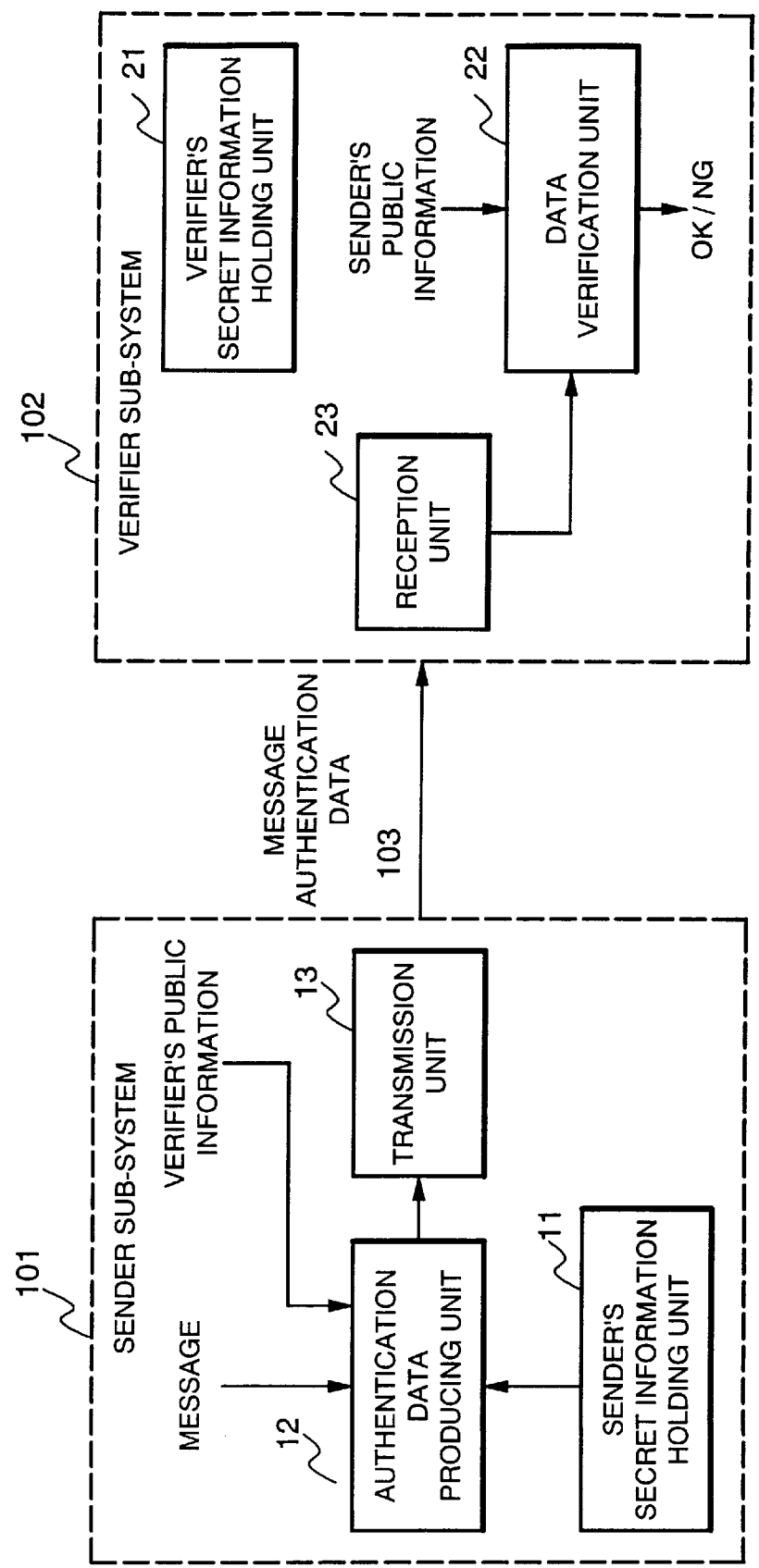
FIG. 1 is a block diagram showing structure of a message authentication system according to a first embodiment of the present invention.

FIG. 1 is a block diagram showing structure of a message authentication system of a first embodiment applying the above-mentioned message authorization system according to the present invention.

As illustrated in the figure, the message authentication system of the present embodiment includes a sender sub-system (sender) 101 and a verifier sub-system (verifier) 102 connected via a communication channel 103. Although it is not shown in FIG. 1, the system ensures such a means enabling the sender 101 and the verifier 102 to obtain the other party's public information as the public information management center 100 shown in FIG. 9.

The sender sub-system 101 includes a sender's secret information holding unit 11 for holding secret information inherent to the sender sub-system 101, an authentication data producing unit 12 for producing authentication data, and a transmission unit 13 for sending produced authentication data to the verifier sub-system 103 via the communication channel 103.

The verifier sub-system 102 includes a verifier's secret information holding unit 21 for holding secret information inherent to the verifier sub-system 102, a data verification unit 22 for verifying authentication data, and a reception unit 23 for receiving authentication data sent from the sender sub-system 101 through the communication channel 103 and sending the data to the data verification unit 22.

Figure 2:
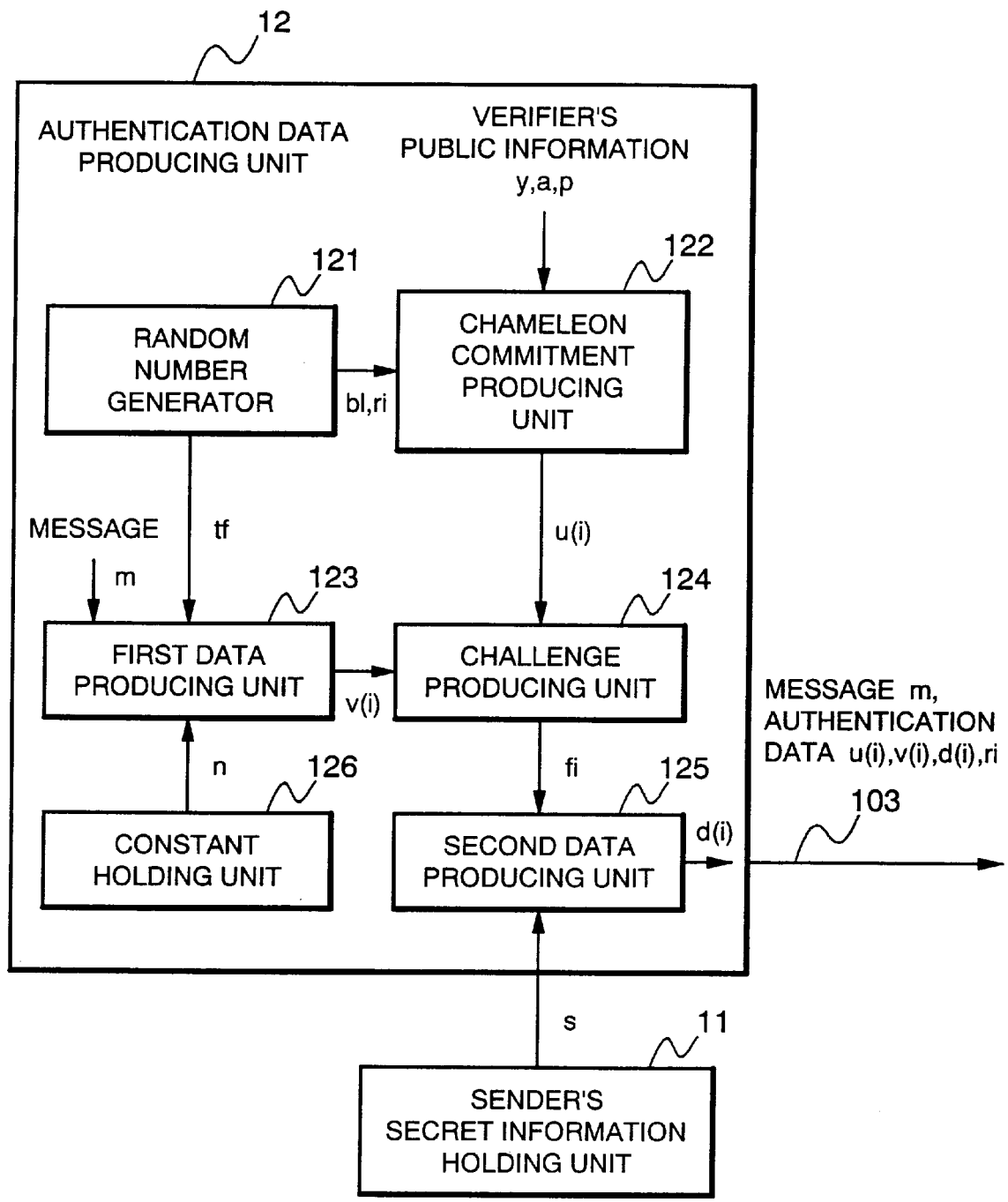
FIG. 2 is a block diagram showing structure of an authentication data producing unit in a sender sub-system according to the present embodiment.
Figure 3:
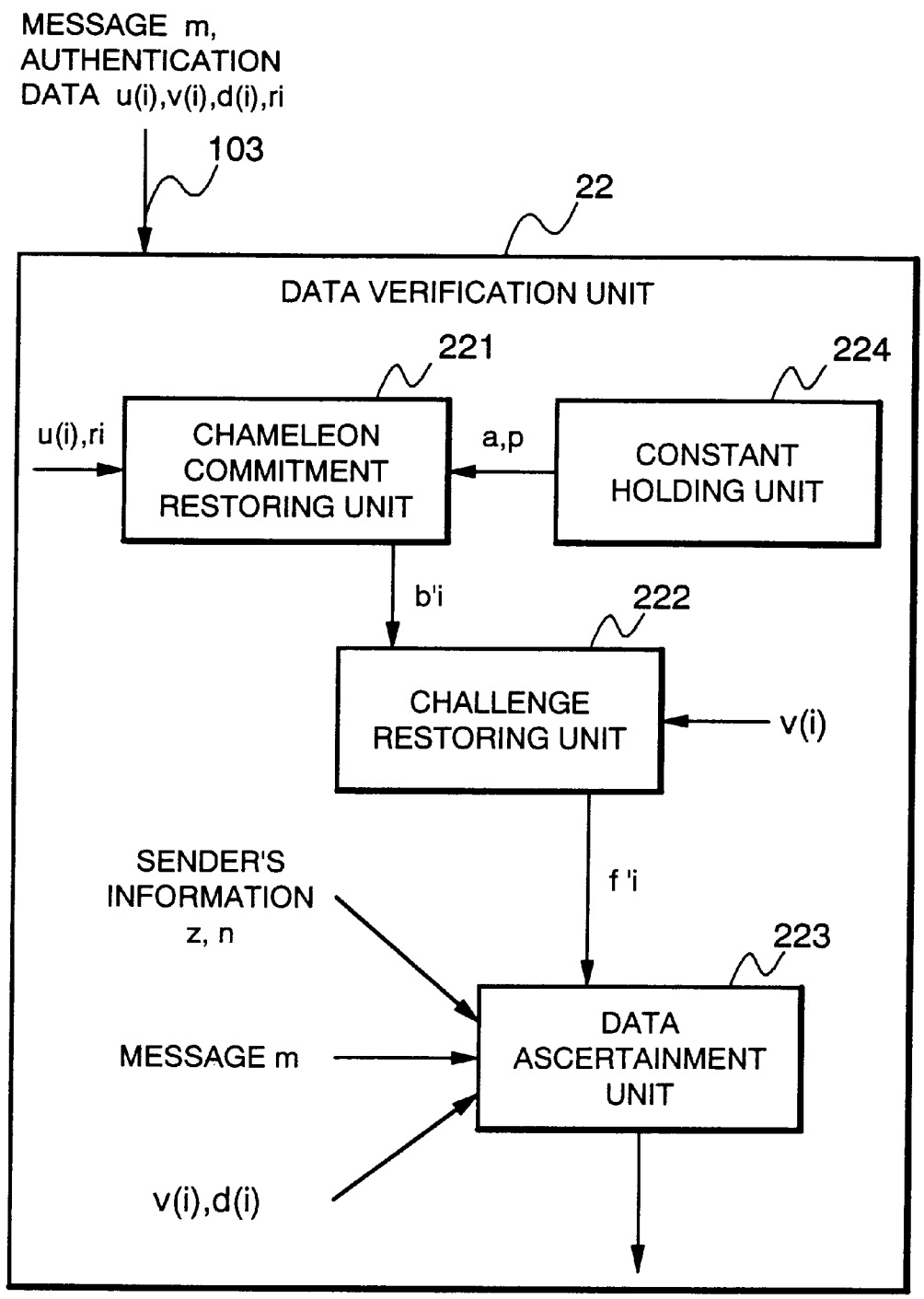
FIG. 3 is a block diagram showing structure of a data verification unit in a verifier sub-system according to the present embodiment.

FIG. 2 is a block diagram showing structure of the authentication data producing unit 12 provided in the sender sub-system 101 and FIG. 3 is a block diagram showing structure of the authentication data verification unit 22 provided in on the verifier sub-system 102.

The authentication data producing unit 12, as shown in FIG. 2, includes a random number generator 121, a chameleon commitment producing unit 122 for producing a chameleon commitment by using public information of the verifier 102 and a random number generated at the random number generator 121, a first data producing unit 123 for producing part of authentication data by using predetermined information and a random number generated at the random number generator 121, a challenge producing unit 124 for producing a challenge by using produced chameleon commitment and authentication data, a second data producing unit 125 for producing the remaining part of authentication data by using a challenge produced by the challenge producing unit 124 and secret information of the sender 101, and a constant holding unit 126 for presenting a necessary constant to the first data producing unit 123.

The data verification unit 22, as shown in FIG. 3, includes a chameleon commitment restoring unit 221 for restoring a random number from received authentication data, a challenge restoring unit 222 for restoring a challenge from authentication data and a restored random number, a data ascertainment unit 223 for ascertaining validity of received data by using public information of the sender 101 and received data, and a constant holding unit 224 for presenting a necessary constant to the chameleon commitment restoring unit 221.

In the above-described figures, illustration is made only of the characteristic part of the structure of the present embodiment and that of the remaining common part is omitted.

Message authentication implemented by thus structured message authentication system of the present embodiment is comprised of a preparation phase for making necessary preparations, an authentication data production phase in which the sender 101 produces authentication data, and a verification phase in which the verifier 102 ascertains validity of authentication data. Description will be given in the following with respect to each phase.

<Preparation Phase>

As preparations for conducting message authentication according to the present embodiment, the sender 101 and the verifier 102 register their own public information at the center 100 and securely keep their corresponding secret keys to themselves. The sender 101 registers, for example, a composite number "n" of two prime numbers and a public key "z" as public information and keeps a secret key "s" in the sender's secret information holding unit 11. At this time, the following relationship holds between the public key "z" and the secret key "s".

$$z = s^{-2} \bmod n \tag{10}$$

On the other hand, the verifier 102 registers a prime number "p", a generating element "a" and a public key "y" as public information and keeps a secret key "x" in the verifier's secret information holding unit 21. At this time, the following relationship holds between the public key "y" and the secret key "x".

$$y = a^x \bmod p \tag{11}$$

Public information (n, z), (p, a, y) is the information freely accessible by both the sender 101 and the verifier 102 through the center 100. As long as public information is reliably sent and received between the sender 101 and the verifier 102, the center 100 is not necessarily provided as mentioned above. In addition, it is assumed that the sender 101 and the verifier 102 know a common hash function "h" in advance.

<Authorization Data Production Phase>

Using the authentication data producing unit 12, the sender 101 produces, in a manner described in the following, authentication data for an electronic document message "m" to be authorized.

First, the random number generator 121 generates 20 random number bits "b1, b2, ..., b20" and 20 random numbers "r1, r2, ..., r20". Then, the chameleon commitment producing unit 122 produces chameleon commitments "u(1), u(2), ..., u(20)" according to the following expression, where "y", "a" and "p" are public information of the verifier 102.

$$u(i) = y^{bi} \cdot a^{ri} \bmod p \tag{12}$$

Next, the random number generator 121 generates 20 random numbers "t1, t2, ..., t20", while the first data producing unit 123 calculates data "v(1), v(2), ..., v(20)" according to the following expression.

$$v(i) = ti^{2h(m)} \bmod n \qquad (13)$$

The challenge producing unit 124 then produces a challenge "fi" in a manner described in the following. First, the challenge producing unit 124 makes all the values of the chameleon commitment "u(i)" and the data "v(i)" (i =1, 2, . . . 20) into hash values and first 20 bits of the calculated hash values are taken as "c1, c2, . . . c20". Then, with respect to each "i", the unit 124 calculates an exclusive OR between a bit "ci" and a random number bit "bi" and outputs its result as a challenge "fi".

Next, the second data producing unit 125 produces data "d(i)" dependent on the challenge "fi" according to the following expression, where "s" denotes secret information read from the sender's secret information holding unit 11.

$$d(i) = ti \cdot s^{fi} \bmod n \qquad (14)$$

Thus produced "u(i)", "v(i)", "d(i)", "ri" (i=1, 2, . . . , 20) are sent as authentication data together with the message "m" from the transmission unit 13 to the verifier 102 through the channel 103.

<Verification Phase>

The verifier 102 verifies authentication data received at the reception unit 23 by means of the data verification unit 22 according to the following procedure.

First, the commitment restoring unit 221 obtains a random number bit "bi'" from received chameleon commitment "u(i)" and random number "ri". When the result of the following expression (15) is equal to "1", the unit 221 restores "bi'" to 0 and when it is equal to "y", the unit restores "bi'" to 1.

$$u(i)/a^{ri} \bmod p \qquad (15)$$

When the result is neither of them, the unit 221 regards the data as false verification data.

The challenge restoring unit 222 then restores a challenge "fi'" in a manner as described in the following. First, the unit 222 makes all the values of the chameleon commitment "u(i)" and the data "v(i)" (i=1, 2, . . . , 20) into hash values and obtains 20 bits "c1', c2', . . ., c20'" of the calculated hash values. Then, with respect to each "i", the unit 222 calculates an exclusive OR of the bit "ci'" and the random number bit "bi'" and regards the result as a challenge "fi'".

Lastly, the data ascertainment unit 223 ascertains the validity of the data by using the data obtained by the foregoing processing. In other words, the unit 223 makes sure that the following expression holds for each "i".

$$d(i)^2 = v(i) \cdot (z^{h(m)})^{fi'} \bmod n \qquad (16)$$

If the above relationship fails to hold for any of "i", determination is made that the data is false authentication data and when the relationship holds for every "i", determination is made that the data is right authentication data.

Thus, authentication data transmitted from the sender 101 to the verifier 102 is verified.

Description will be next given of non-divertibility of authentication data of the present embodiment, that is, that the data is characterized in that it can not be verified by a third party. According to the present embodiment, the verifier 102 is capable of producing consistent authentication data at will by using his own secret key. Therefore, even if authentication data is given to a third party, the third party is incapable of discriminating right authentication data produced by an authorizer (sender 101) from false authentication data produced by the verifier 102.

The reason why the verifier 102 can produce consistent authentication data is that a challenge is produced at the authentication data producing unit 12 of the sender 101 based on a chameleon commitment. Chameleon commitment is a system in which while a commitment producer is only capable of unitarily select a predetermined numerical value, a commitment restorator is capable of pretending that the producer selects another numerical value. The verifier 102 who is a commitment restorator can operate a value of a random number bit at will by using a chameleon commitment, a random number and his own secret key to alter a challenge, thereby producing authentication data suitable for himself. Authorization data produced by the verifier 102 is therefore useless for authentication.

A second embodiment of the present invention will be described in the following.

The present embodiment includes a sender sub-system 101 and a verifier sub-system 102 structured similarly to those of the first embodiment shown in FIG. 1, with the only difference being that the sender sub-system 101 includes an authentication data producing unit 32 for producing authentication data by operation different from that of the authentication data producing unit 12 in the first embodiment and that the verifier sub-system 102 includes an authentication data verification unit 42 for verifying authentication data by operation different from that of the authentication data verification unit 22 in the first embodiment.

Figure 4:
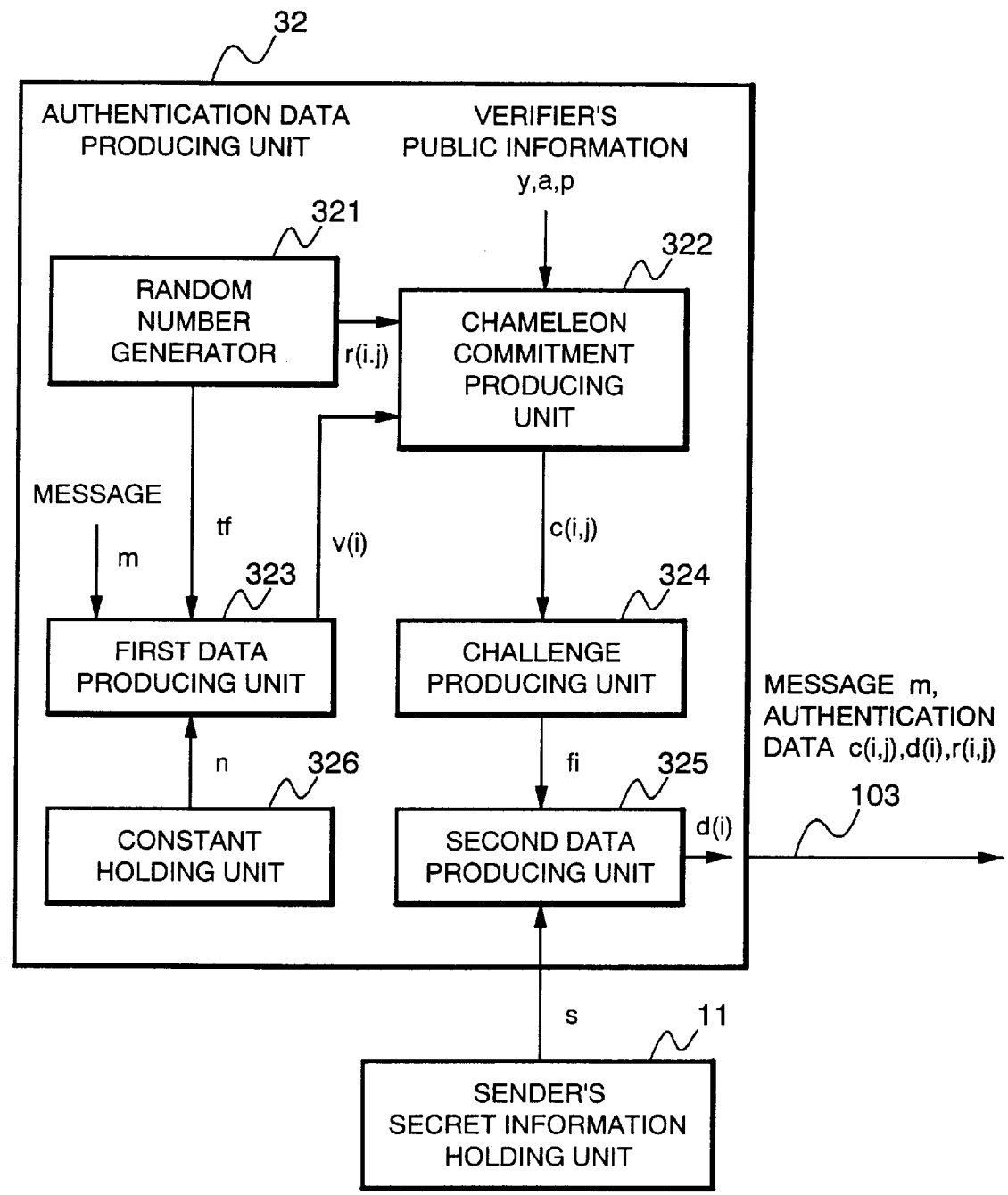
FIG. 4 is a block diagram showing structure of an authentication data producing unit in a sender sub-system of a message authentication system according to a second embodiment of the present invention.
Figure 5:
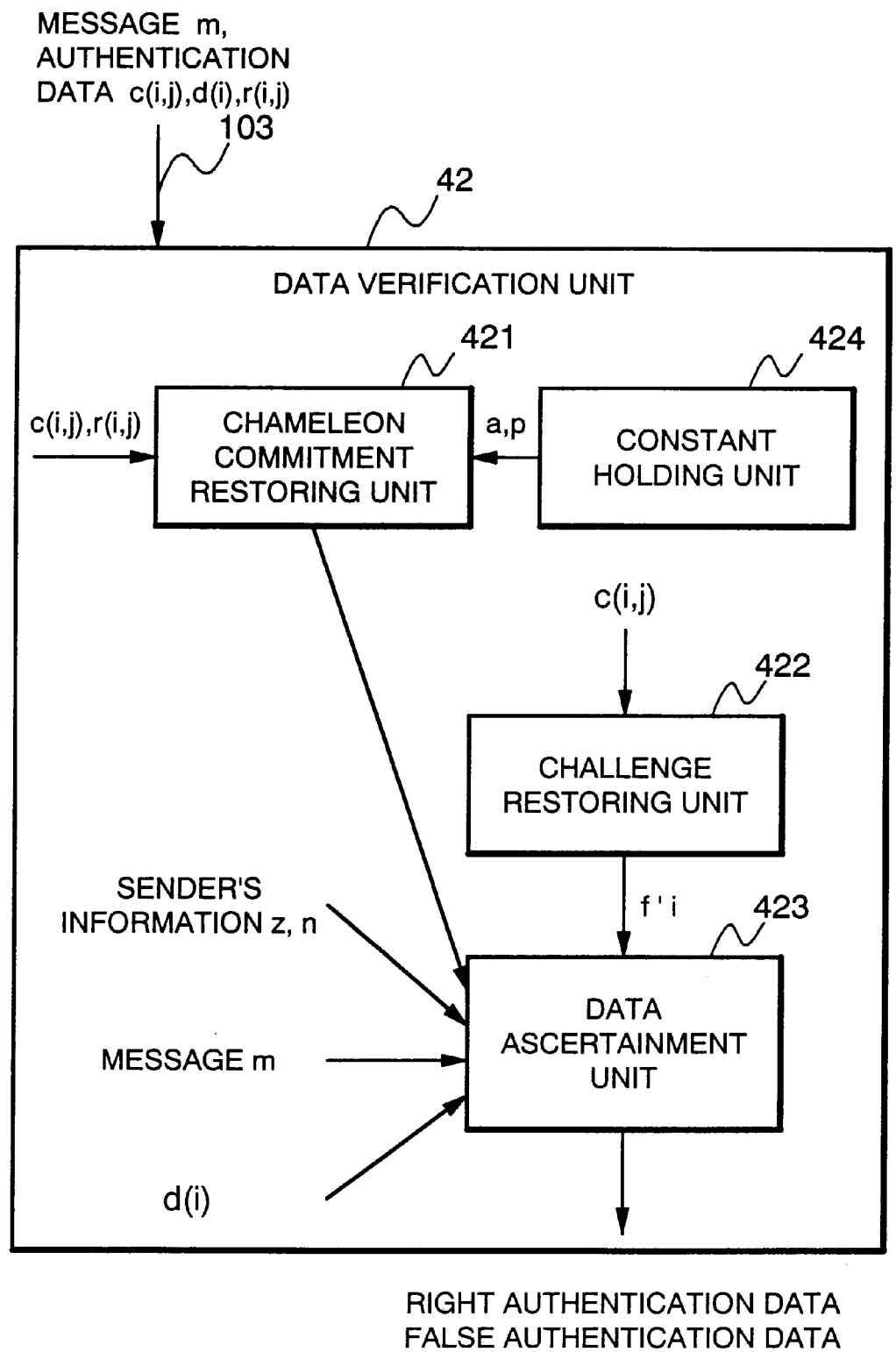
FIG. 5 is a block diagram showing structure of a data verification unit in a verifier sub-system of the message authentication system according to the second embodiment of the present invention.

FIG. 4 is a block diagram showing structure of the authentication data producing unit 32 provided in the sender sub-system 101 of the present embodiment, while FIG. 5 is a block diagram showing structure of the authentication data verification unit 42 provided in the verifier sub-system 102 of the present embodiment.

The authentication data producing unit 32 includes, as shown in FIG. 4, a random number generator 321, a first data producing unit 323 for producing part of authentication data by using predetermined information and a random number generated at the random number generator 321, a chameleon commitment producing unit 322 for producing a chameleon commitment by using public information of the verifier 102, a random number generated at the random number generator 321 and data produced at the first data producing unit, a challenge producing unit 324 for producing a challenge by using a produced chameleon commitment, a second data producing unit 325 for producing the remaining part of authentication data by using a challenge produced at the challenge producing unit 324 and secret information of the sender 101, and a constant holding unit 326 for presenting a necessary constant to the first data producing unit 323.

The data verification unit 42 includes, as shown in FIG. 5, a chameleon commitment restoring unit 421 for restoring first data from received authentication data, a challenge restoring unit 422 for restoring a challenge from authentication data, a data ascertainment unit 423 for ascertaining the validity of received data by using public information of the sender 101, received data and a restored first data, and a constant holding unit 424 for presenting a necessary constant to the chameleon commitment restoring unit 421.

In the above-described figures, illustration is made only of a characteristic part of the structure of the present embodiment and that of the remaining common part of the structure is omitted.

Message authentication implemented by thus structured message authentication system of the present embodiment is comprised of a preparation phase for making necessary preparations, an authentication data production phase in which a sender 101 produces authentication data, and a verification phase in which a verifier 102 ascertains validity of authentication data. The preparation phase is the same as that of the first embodiment and its description will be therefore omitted. Authorization data production phase and verification phase will be described in the following.

<Authorization Data Production Phase>

The sender 101 produces authentication data for an electronic document message "m" to be authorized by means of the authentication data producing means 12 according to the following procedure.

First, the random number generator 321 generates random numbers "t1 t2, . . ., t20". The first data producing unit 323 calculates data "v(1), v(2), v(20)" according to the following expression.

$$v(i) = t_i^{2h(m)} \bmod n \tag{17}$$

Assuming that the number of bits of "n" is "k", each "v(i)" represents the number of k bits. In the following, a value of the j-th bit of "v(i)" is represented as "v(i, j)".

Next, the random number generator 321 generates a random number "r(i, j)" corresponding to each bit value "v(i, j)". Then, the chameleon commitment producing unit 322 produces a chameleon commitment "c(i, j)" according to the following expression, where "y", "a" and "p" represent public information of the verifier 102.

$$c(i,j) = y^{v(i,j)} \cdot a^{r(i,j)} \bmod p \tag{18}$$

The challenge producing unit 324 then produces a challenge "fi" in a manner as described in the following. First, the unit 324 makes chameleon commitments "c(i, j)" which are linked to each other with respect to all (i, j) into hash values and takes first 20 bits of the calculated hash values as "f1, f2, . . . , f20".

The second data producing unit 325 then produces data "d(i)" dependent on the challenge "fi" according to the following expression, where "s" represents secret information read from the sender's secret information holding unit 11.

$$d(i) = t_i \cdot s^{f_i} \bmod n \tag{19}$$

Thus produced "c(i, j)", "d(i)", "r(i, j)" (i=1, 2, . . . , 20, j=1, 2, . . . , k) are sent as authentication data together with the message "m" from the transmission unit 13 to the verifier 102 through the channel 103.

<Verification Phase>

The verifier 102 verifies authentication data received at the reception unit 23 by means of the data verification unit 22 according to the following procedure.

First, the commitment restoring unit 421 obtains data "v'(i)" from received chameleon commitment "c(i, j)" and random number "r(i, j)". When the result of the following expression (20) is equal to "1", the unit 421 restores "v' (i, j)" to 0 and when it is equal to "y", the unit restores "v' (i, j)'" to 1. If the result is neither of them, the unit 421 regards the data as false verification data.

$$c(i,j)/a^{r(i,j)} \bmod p \tag{20}$$

The challenge restoring unit 422 then restores a challenge "fi'" in a manner as described in the following. First, the unit 422 makes chameleon commitments "c(i, j)" which are linked to each other with respect to all (i, j) into hash values and obtains first 20 bits "f1', f2', . . . , f20'" of the calculated hash values.

Lastly, the data authentication unit 423 ascertains the validity of the data by using the data obtained by the foregoing processing. In other words, the unit 423 makes sure that the following expression holds for each "i".

$$d(i)^2 = v'(i) \cdot (z^{h(m)})^{f_i'} \bmod n \tag{21}$$

When the above relationship fails to hold for any of "i", determination is made that the data is false authentication data and when the relationship holds for every "i", determination is made that the data is right authentication data.

Thus, authentication data transmitted from the sender 101 to the verifier 102 is verified.

In the above-described message authentication system according to the second embodiment, as well as that of the first embodiment, the verifier 102 can produce false authentication data by operating a value of a random number r(i, j). Authorization data produced by the verifier 102 is therefore useless for authentication, satisfying non-divertibility of authentication data to a third party.

As described in detail in the foregoing, the present invention realizes message authentication whose non-divertibility by a third party is achieved simply through sending of verification data from a sender to a verifier to designate a verifier without communication between them.

Digital signing system implementing undeniable signature of a third embodiment applying the above-mentioned message authorization system according to the present invention will be described.

Figure 6:
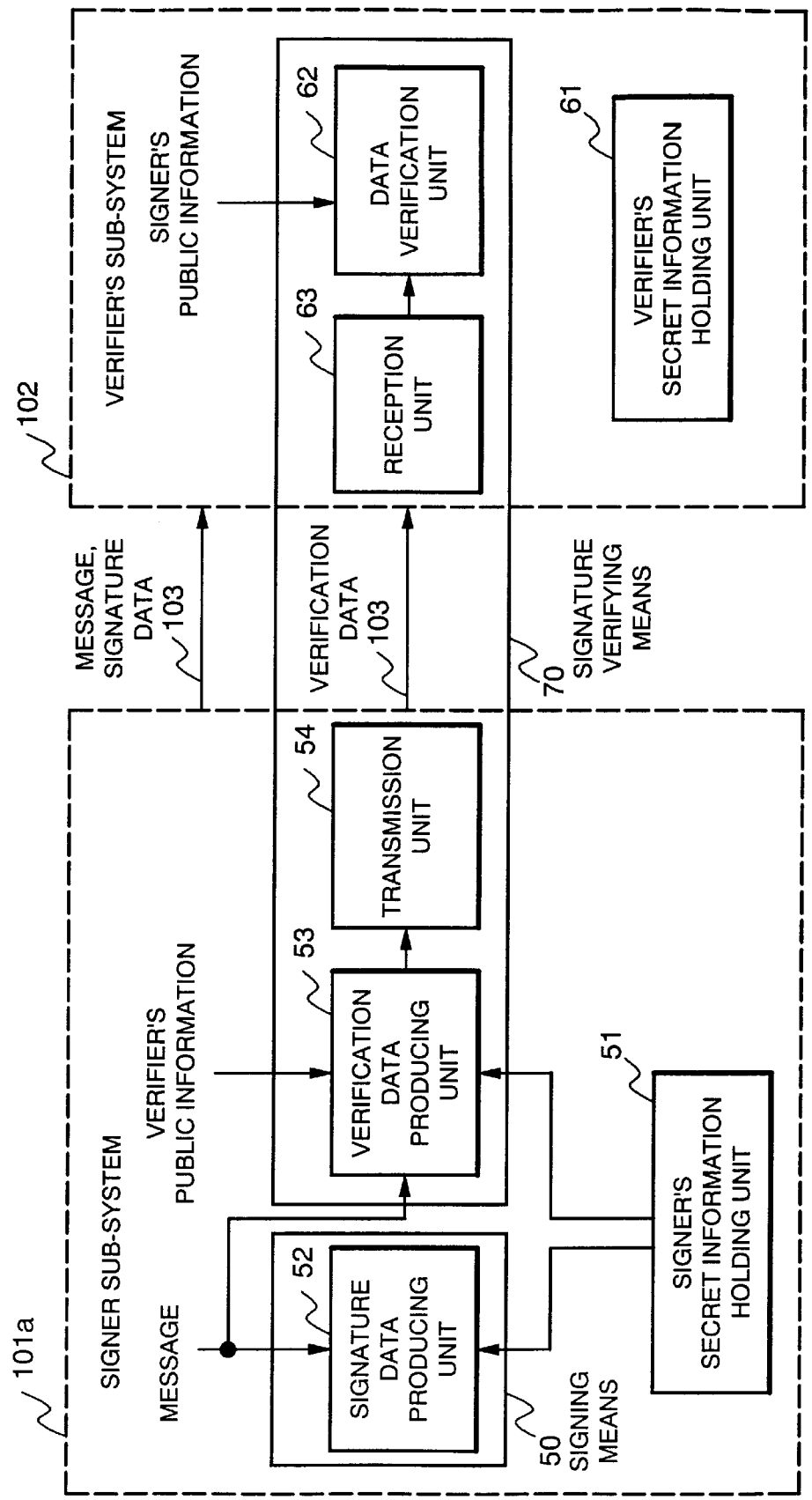
FIG. 6 is a block diagram showing a digital signing system according to a third embodiment of the present invention.

FIG. 6 is a block diagram showing structure of a digital signing system according to a third embodiment of the present invention. Since a sender will be a signer in the digital signing system, the sender sub-system 101 will be referred to as a signer sub-system 101a or a signer 101a in the following description.

As illustrated in the figure, the digital signing system of the present embodiment includes a signer sub-system 101a and a verifier sub-system 102 connected via a communication channel 103. Although it is not illustrated in the figure, the system ensures such a means enabling the signer 101a and the verifier 102 to obtain the other party's public information as the public information management center 100 shown in FIG. 9.

The signer sub-system 101a includes a signer's secret information holding unit 51 for holding secret information inherent to the signer sub-system 110a, a signature data producing unit 52 for producing signature data, a verification data producing unit 53 for producing verification data for the verification of a signature, and a transmission unit 54 for sending produced signature data and verification data to the verifier sub-system 102 via the communication channel 103.

The verifier sub-system 102 includes a verifier's secret information holding unit 61 for holding secret information inherent to the verifier sub-system 102, a data verification unit 62 for verifying verification data, and a reception unit 63 for receiving authentication data sent from the signer sub-system 101a through the communication channel 103 and sending the data to the data verification unit 62.

As illustrated in the figure, the signature data producing unit 52 of the signer sub-system 101a constitutes a signing means 50 for signing an electronic document. The verification data producing unit 53 and the transmission unit 54 of the signer sub-system 101a and the data verification unit 62 and the reception unit 63 of the verifier sub-system 102 constitute a signature verifying means 70 for verifying a signature.

Figure 7:
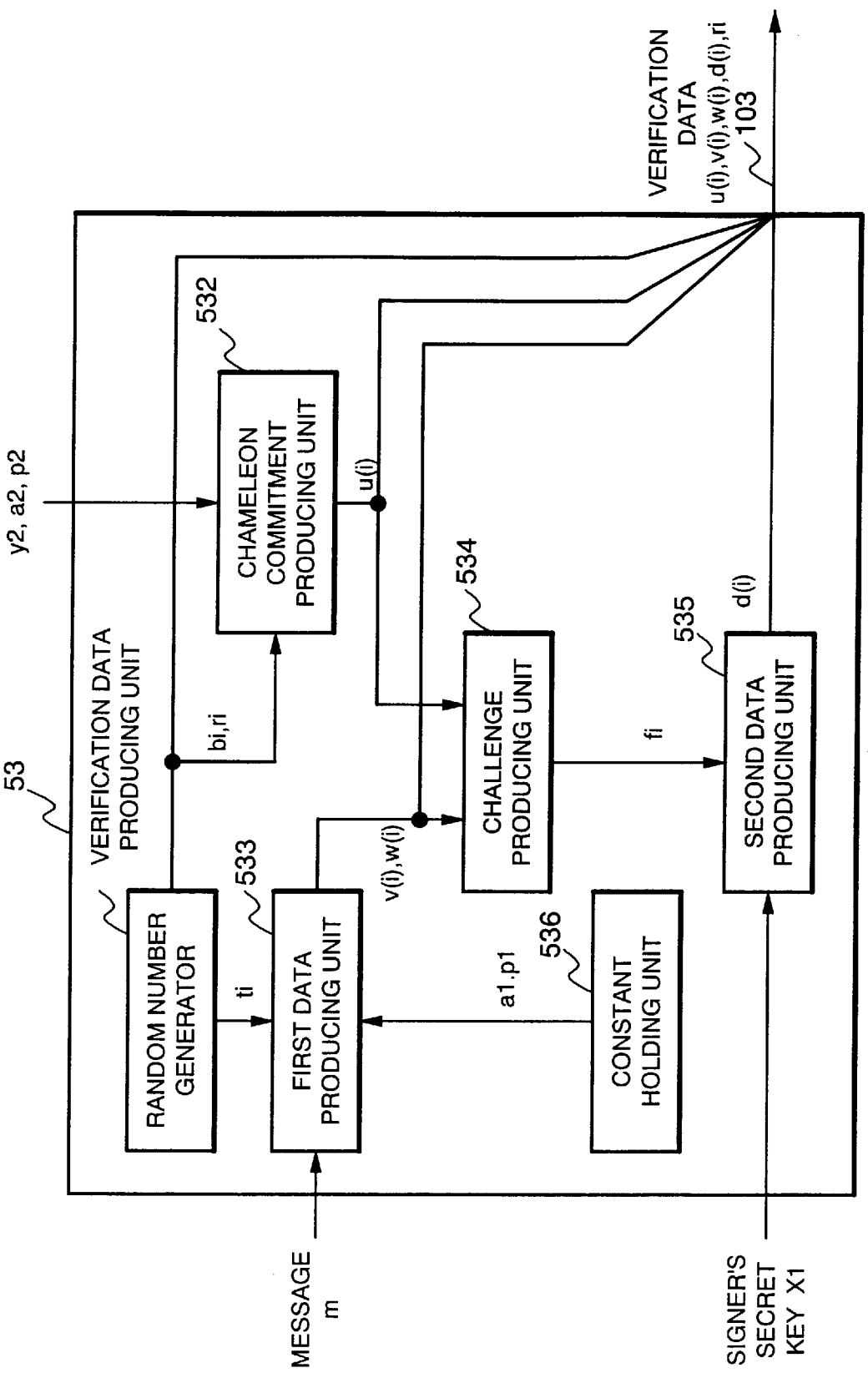
FIG. 7 is a block diagram showing structure of a verification data producing unit of a signer sub-system according to the present embodiment.
Figure 8:
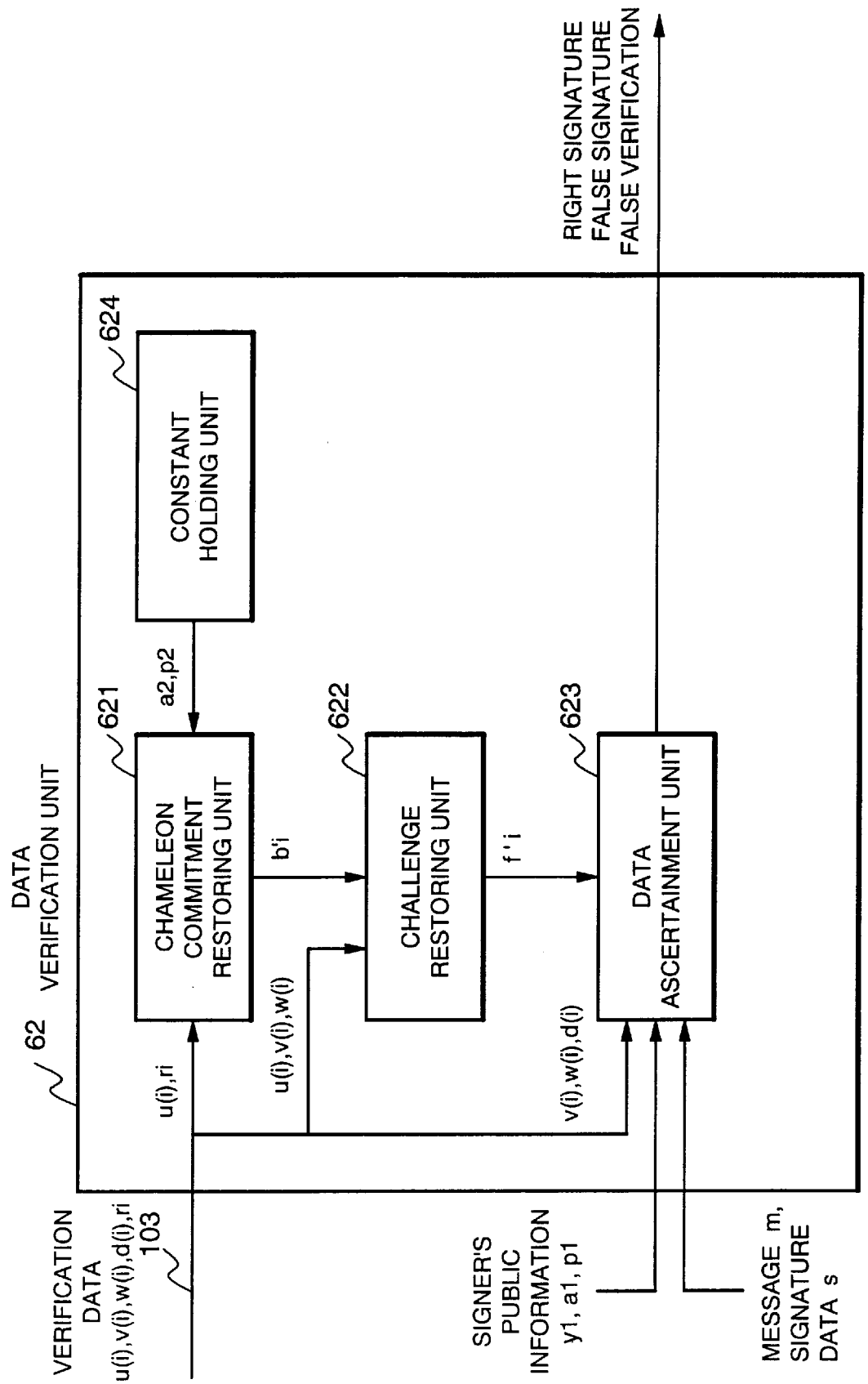
FIG. 8 is a block diagram showing structure of a data verification unit in a verifier sub-system according to the present embodiment.

FIG. 7 is a block diagram showing structure of the verification data producing unit 53 provided in the signer sub-system 101a and FIG. 8 is a block diagram showing structure of the data verification unit 62 provided in the verifier sub-system 102.

The verification data producing 53 includes, as shown in FIG. 7, a random number generator 531, a chameleon commitment producing unit 532 for producing a chameleon commitment by using public information of the verifier 102 and a random number generated at the random number generator 531, a first data producing unit 533 for producing part of verification data by using predetermined information and a random number generated at the random number generator 531, a challenge producing unit 534 for producing a challenge by using produced chameleon commitment and verification data, a second data producing unit 535 for producing the remaining part of verification data by using a challenge produced by the challenge producing unit 534 and secret information of the signer 110*a*, and a constant holding unit 536 for presenting a necessary constant to the first data producing unit 533.

The data verification unit 62, as shown in FIG. 8, includes a chameleon commitment restoring unit 621 for restoring a chameleon commitment from received verification data, a challenge restoring unit 622 for restoring a challenge from verification data and a restored chameleon commitment, a data ascertainment unit 623 for ascertaining the validity of signature data by using public information of the signer 101*a* and received data, and a constant holding unit 624 for presenting a necessary constant to the chameleon commitment restoring unit 621.

In the above-described figures, illustration is made only of a characteristic part of the structure of the present embodiment and that of the remaining common part is omitted.

Verification of a digital signature implemented by thus structured digital signing system of the present embodiment is comprised of a preparation phase for making necessary preparations, a signing phase for signing and a verification phase for ascertaining the validity of signature data. Description will be given with respect to each phase in the following.

<Preparation Phase>

As preparations for conducting digital signing according to the present embodiment, the signer 101*a* and the verifier 102 register their own public information at the center 100 and securely keep their corresponding secret keys to themselves. The signer 101*a* registers, for example, a prime number "p1", a constant "a1" and a public key "y1" as public information and keeps a secret key "x1" in the signer's secret information holding unit 51. At this time, the following relationship holds between the public information "p1", "a1" and "y1" and the secret key "x1".

$$y1 = a1^{x1} \bmod p1 \tag{22}$$

In the above expression, the constant "a1" may be a generating element of a finite field with the modulus "p1".

On the other hand, the verifier 102 registers a prime number "p2", a constant "a2" and a public key "y2" as public information and keeps a secret key "x2" in the verifier's secret information holding unit 61. At this time, the following relationship holds between the public information "p2", "a2" and "y2" and the secret key "x2".

$$y2 = a2^{x2} \bmod p2 \tag{23}$$

In the above expression, the constant "a2" may be a generating element of a finite field with the modulus "p2". There will be no problem in terms of reliability when the signer 101*a* and the verifier 102 use common prime number and generating element. In other words, p1=p2 and a2=a2 are possible.

<Signing Phase>

At the signer 101*a*, the signature data producing unit 52 produces signature data "s" for an electronic document message "m" to be signed according to the following expression, where "x1" represents a secret key read from the signer's secret information holding unit 51.

$$S = m^{x1} \bmod p1 \tag{24}$$

The produced signature data "s" is sent together with the message "m" to the verifier 102 through the communication channel 103.

<Verification Phase>

Consideration will be given to a case where a certain verifier 102 is to verify signature data "s" with respect to the message "m". If the signer 101*a* authorizes the verifier 102 to verify the signature data "s" in question, verification phase is conducted. For conducting the verification phase, the signer 110*a* first obtains public information of the verifier 102 from the center 100 or from the verifier 102 himself.

The verification data producing unit 53 of the signer 110*a* produces verification data which enables the verifier 102 to verify, by using the public key "y1", whether the signature data "s" is produced with the secret key "x1" of the signer 101. More specifically, data is produced which enables the verifier 102 to verify whether the signature data "s" and the public key "y1" are raised to the same power with the message "m", and the constant "a1" as the public information as bases, respectively, because the signature data "s" is produced according to the above expression (24) and the public key "y1" is produced according to the above expression (22). Verification results will be three, "right signature data", "false signature data" and "verification impossible due to false verification data".

First, the random number generator 531 generates 20 random number bits "b1, b2, . . . , b20" (one bit each) and 20 random numbers "r1, r2, . . . , r20" (approximate to that of "p2"). The chameleon commitment producing unit 532 then produces chameleon commitments "u(1), u(2), . . . , u(20)" according to the following expression, where "y2", "a2" and "p2" are public information of the verifier 102.

$$u(i) = y2^{bi} \cdot a2^{ri} \bmod p2 \tag{25}$$

The random number generator 531 again generates 20 random numbers "t1, t2, . . ., t20" (each has a multiple bit and its bit length is preferably approximate to that of "p1"). The first data producing unit 533 then calculates data "v(1), v(2), . . . , v(20)" and data "w(1), w(2), . . . , w(20)". "a1" and "p1" are public information of the signer 101*a* and those stored in the constant holding unit 536 in advance are used.

$$v(i) = a1^{ti} \bmod p1 \tag{26}$$

$$W(i) = m^{ti} \bmod p1 \tag{27}$$

Next, the challenge producing unit 534 produces a challenge "fi" in the following manner. First, values obtained by linking a chameleon commitment "u(i)", data "v(i)" and "w(i)" (i=1, 2, . . . , 20) are operated with a predetermined hash function to have hash values and first 20 bits of the calculated hash values are taken as "c1, c2, . . ., c20". Then, with respect to each "i", an exclusive OR between the bit "ci" and the random number bit "bi" is calculated and the calculation result is output as a challenge "fi".

The second data producing unit 535 then produces data "d(i)" dependent on the challenge "fi" in the following manner. That is, when the challenge "fi" is "0", the following expression (28) is made to hold and otherwise, the following expression (29) is made to hold.

$$d(i) = ti \tag{28}$$

$$d(i) = ti - xi \tag{29}$$

The verification data producing unit 53 sends thus produced "u(i)", "v(i)", "w(i)", "d(i)" and "(ri) (i =1, 2, ..., 20) as verification data from the communication unit 54 to the verifier 102 via the communication channel 103.

The verifier 102 verifies the received verification data by means of the data verification unit 62.

First, the chameleon commitment restoring unit 621 obtains a random number bit "bi'" based on the chameleon commitment "u(i)" and the random number "ri" in the verification data received from the signer 110a and the public information "a2" and p2" of the verifier 102 held in the constant holding unit 624 in advance. Here, the random number bit "bi'" is a value which goes to 0 when a calculation result of the following expression (30) is equal to "1" and goes to 1 when the result is equal to "y2". When the calculation result is neither "1" nor "y2", determination is made that the data is false verification data.

$$u(i)/a2^{ri} \bmod p2 \tag{30}$$

Next, the challenge restoring unit 622 restores a challenge "fi'" in the following manner. Values obtained by linking chameleon commitment "u(i)", data "v(i)" and "w(i)" (i=1, 2, ..., 20) similarly to those linked in the challenge producing unit 534 of the signer 101a are operated with the same hash function as that used in the challenge producing unit 534 of the signer 101a to have hash values. Then, first 20 bits of the calculated hash values are taken as "c1', c2', ..., c20'". With respect to each "i", an exclusive OR between the bit "ci'" and the random number bit "bi'" is calculated and the calculation result is taken as the challenge "fi'".

Lastly, the data ascertainment unit 623 ascertains the validity of the signature data by using the data obtained by the foregoing processing. More specifically, with respect to each "i", when "fi'" is "0", the unit 623 ascertains that the following expressions (31) and (32) hold.

$$v(i) = a1^{d(i)} \bmod p1 \tag{31}$$

$$w(i) = m^{d(i)} \bmod p1 \tag{32}$$

With respect to each "i", if "fi" is "1", the unit 623 ascertains that the following expressions (33) and (34) hold.

$$v(i) = a1^{d(i)} \cdot y1 \bmod p1 \tag{33}$$

$$W(i) = m^{d(i)} \cdot s \bmod p1 \tag{34}$$

With respect to each "i" for which "fi" is "1", when only the above expression (34) fails to hold and the remaining expressions hold, determination is made that "the signature data is not that of the signer". In other words, this is a case where the verification data is right but the signature data is not right. When all of the above expressions hold for every "i", determination is made that "the signature data is that of the signer". In other words, this is the case where both the verification data and the signature data are right; otherwise determination is made that "the signer unfaithfully produces the verification data". In other words, this is the case where verification is impossible because the verification data is false.

Thus, the signature data can be verified simply by sending of verification data from the signer 101a to the verifier 102 without communication between them.

Description will be next given of that this verification data has non-divertibility.

First reason is as follows. Since public information of a verifier 102 is used in verification data, the verification data is only for the verifier, and a secret key of a signer 101a is used for the production of the verification data, so that the verifier 102 who does not know the secret key is incapable of producing verification data for a third party by using public information of a third party in place of its own public information. The third party therefore can not verify the signature data in question unless he obtains verification data for his own directly from the signer 101a.

Second reason is as follows. A verifier 102 can produces consistent verification data by using his own secret key at will. Therefore, even if the verifier 102 gives verification data to a third party, the third party is incapable of determining whether the data is right verification data produced by a signer 101a or false verification data produced by the verifier 102. For a third party to verify the signature data in question, he should receive verification data for his own directly from the signer 101a. In this case, signer 101a only has to prepare the signature data for the third party. Verification data is therefore unsusceptible to diversion.

The reason why the verifier 102 can produce consistent verification data is that, as described above, a challenge is produced using a chameleon commitment at the verification data producing unit 53.

As described in the foregoing, the present invention realizes digital signature whose non-divertibility by a third party is achieved simply through sending of verification data from a signer to a verifier to designate the verifier without communication between them.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A message authorization system for conducting message authorization of an electronic document comprising:

a sender sub-system that adds authorization data and sends the electronic document; and a verifier sub-system that ascertains a validity of the authorization data, wherein said sender sub-system and said verifier sub-system each having an inherent secret key and an inherent public key corresponding to the secret key, said sender sub-system including authorization data producing means for producing said authorization data dependent on the public key of said verifier sub-system and the secret key of said sender sub-system, and said verifier sub-system including data verifying means for verifying said authorization data received from said sender sub-system based on the public key of said sender sub-system.

2. The message authorization system as set forth in claim 1, wherein said authorization data producing means of said sender sub-system produces a chameleon commitment dependent on the public key of said verifier sub-system and produces said authorization data based on the chameleon commitment, and said data verifying means of said verifier sub-system verifies said authorization data based on a chameleon commitment included in said authorization data.

3. The message authorization system as set forth in claim 1, wherein said authorization data producing means of said sender sub-system comprising:

chameleon commitment producing means for producing a chameleon commitment based on the public key of said verifier sub-system, and a first arbitrary random number of said sender sub-system, first data producing means for producing first partial authorization data based on the public key and a second arbitrary random number of said sender sub-system, challenge producing means for producing a challenge based on said chameleon commitment and said first partial authorization data, and second data producing means for producing second partial authorization data based on said challenge and the secret key of said sender sub-system, and said authorization data producing means sends said chameleon commitment, said first partial authorization data, said second partial authorization data and the value of said first arbitrary random number used in the production of said chameleon data, as authorization data, to said verifier sub-system, and wherein said data verifying means of said verifier sub-system comprising:

chameleon commitment restoring means for restoring a random number based on the public key of said verifier sub-system, said chameleon commitment and said first arbitrary random number value included in said authorization data, challenge restoring means for restoring said challenge based on said restored random number and said first partial authorization data, and data ascertaining means for verifying said authorization data based on said restored challenge, said first and second partial authorization data and the public key of said sender sub-system.

4. The message authorization system as set forth in claim 1, wherein said authorization data producing means of said sender sub-system comprising:

first data producing means for producing first partial authorization data based on the public key and a first arbitrary random number of said sender sub-system, chameleon commitment producing means for producing a chameleon commitment based on said first partial authorization data, and the public key of said verifier sub-system and a second arbitrary random number of said sender sub-system, challenge producing means for producing a challenge based on said chameleon commitment, and second data producing means for producing second partial authorization data based on said challenge and the secret key of said sender sub-system, and wherein said authorization data producing means sends said chameleon commitment, said second partial authorization data and the value of said first arbitrary random number used in the production of said chameleon data, as authorization data, to said verifier sub-system, and said data verifying means of said verifier sub-system comprising:

chameleon commitment restoring means for restoring said first partial authorization data based on the public key of said verifier sub-system, said chameleon commitment and said second arbitrary random number value included in said received authorization data, challenge restoring means for restoring said challenge based on said chameleon commitment, and data ascertaining means for verifying said authorization data based on said restored challenge, said restored first partial authorization data, said second partial authorization data and the public key of said sender sub-system.

5. The message authorization system as set forth in claim 1, wherein the public key of said sender sub-system and the public key of said verifier sub-system are open to the public by a predetermined means so as to be accessible irrespective of transmission and reception of said electronic document and said authorization data.

6. The message authorization system as set forth in claim 1, wherein the public key of said sender sub-system and the public key of said verifier sub-system are open to the public by a predetermined means so as to be accessible irrespective of transmission and reception of said electronic document and said authorization data, said authorization data producing means of said sender sub-system produces a chameleon commitment dependent on the public key of said verifier sub-system and produces said authorization data based on the chameleon commitment, and said data verifying means of said verifier sub-system verifies said authorization data based on the chameleon commitment included in said authorization data.

7. The message authorization system as set forth in claim 1, wherein the public key of said sender sub-system and the public key of said verifier sub-system are open to the public by a predetermined means so as to be accessible irrespective of transmission and reception of said electronic document and said authorization data, said authorization data producing means of said sender sub-system comprising:

chameleon commitment producing means for producing a chameleon commitment based on the public key of said verifier sub-system, and a first arbitrary random number of said sender sub-system, first data producing means for producing first partial authorization data based on the public key and a second arbitrary random number of said sender sub-system, challenge producing means for producing a challenge based on said chameleon commitment and said first partial authorization data, and second data producing means for producing second partial authorization data based on said challenge and the secret key of said sender sub-system, and said authorization data producing means sends said chameleon commitment, said first partial authorization data, said second partial authorization data and the value of said first arbitrary random number used in the production of said chameleon data, as authorization data, to said verifier sub-system, and said data verifying means of said verifier sub-system comprising:

chameleon commitment restoring means for restoring a random number based on the public key of said verifier sub-system, said chameleon commitment and said first arbitrary random number value included in said authorization data, challenge restoring means for restoring said challenge based on said restored random number and said first partial authorization data, and data ascertaining means for verifying said authorization data based on said restored challenge, said first and second partial authorization data and the public key of said sender sub-system.

8. The message authorization system as set forth in claim 1, wherein the public key of said sender sub-system and the public key of said verifier sub-system are open to the public by a predetermined means so as to be accessible irrespective of transmission and reception of said electronic document and said authorization data, said authorization data producing means of said sender sub-system comprising:

first data producing means for producing first partial authorization data based on the public key and a first arbitrary random number of said sender sub-system, chameleon commitment producing means for producing a chameleon commitment based on said first partial authorization data, the public key of said verifier sub-system and a second arbitrary random number of said sender sub-system, challenge producing means for producing a challenge based on said chameleon commitment, and second data producing means for producing second partial authorization data based on said challenge and the secret key of said sender sub-system, and said authorization data producing means sends said chameleon commitment, said second partial authorization data and the value of said second arbitrary random number used in the production of said chameleon data, as authorization data, to said verifier sub-system, and said data verifying means of said verifier sub-system comprising:

chameleon commitment restoring means for restoring said first partial authorization data based on the public key of said verifier sub-system, said chameleon commitment and said second arbitrary random number value included in said received authorization data, challenge restoring means for restoring said challenge based on said chameleon commitment, and data ascertaining means for verifying said authorization data based on said restored challenge, said restored first partial authorization data, said second partial authorization data and the public key of said sender sub-system.

9. A message authorization system for implementing signing by adding signature data to an electronic document comprising:

a sender sub-system for adding the signature data and sending the electronic document; and a verifier sub-system that verifies the signature data, wherein said sender sub-system and said verifier sub-system each having an inherent secret key and an inherent public key corresponding to the secret key, said sender sub-system comprising:

signature data producing means for producing signature data dependent on the secret key of said sender, and verification data producing means for producing said verification data dependent on the public key of said verifier sub-system and the secret key of said sender sub-system, and said verifier sub-system comprising:

data verifying means for verifying said signature data applied to said electronic document based on said verification data received from said sender sub-system and the public key of said sender sub-system.

10. The message authorization system as set forth in claim 9, wherein said verification data producing means of said sender sub-system produces a chameleon commitment dependent on the public key of said verifier sub-system and produces said verification data based on the chameleon commitment, and said data verifying means of said verifier sub-system restores predetermined key based on a chameleon commitment included in said verification data and verifies said signature data based on the restored key, said verification data and the public key of said sender sub-system.

11. The message authorization system as set forth in claim 9, wherein said verification data producing means of said sender sub-system comprising:

chameleon commitment producing means for producing a chameleon commitment based on the public key of said verifier sub-system, and a first arbitrary random number of said sender sub-system, first data producing means for producing first partial verification data based on the public key and a second arbitrary random number of said sender sub-system, challenge producing means for producing a challenge based on said chameleon commitment and said first partial verification data, and second data producing means for producing second partial verification data based on said challenge and the secret key of said sender sub-system, and said verification data producing means sends said chameleon commitment, said first partial verification data, said second partial verification data and the value of said first arbitrary random number used in the production of said chameleon data, as verification data, to said verifier sub-system, and said data verifying means of said verifier sub-system comprising:

chameleon commitment restoring means for restoring a random number based on the public key of said verifier sub-system, said chameleon commitment and said first arbitrary random number value included in said received authorization data, challenge restoring means for restoring said challenge based on said restored random number, said chameleon commitment and said first partial verification data, and data ascertaining means for verifying said signature data based on said restored challenge, said first and second partial verification data and the public key of said sender.

12. The message authorization system as set forth in claim 9, wherein the public key of said sender sub-system and the public key of said verifier sub-system are open to the public by a predetermined means so as to be accessible irrespective of transmission and reception of said electronic document with said signature data applied.

13. The message authorization system as set forth in claim 9, wherein the public key of said sender sub-system and the public key of said verifier sub-system are open to the public by a predetermined means so as to be accessible irrespective of transmission and reception of said electronic document with said signature data applied, said verification data producing means of said sender sub-system produces a chameleon commitment dependent on the public key of said verifier sub-system and produces said verification data based on the chameleon commitment, and said data verifying means of said verifier sub-system restores predetermined information based on the chameleon commitment included in said verification data and verifies said signature data based on the restored information, said verification data, and the public key of said sender sub-system.

14. The message authorization system as set forth in claim 9, wherein the public key of said sender sub-system and the public key of said verifier sub-system are open to the public by a predetermined means so as to be accessible irrespective of transmission and reception of said electronic document with said signature data applied, said verification data producing means of said sender sub-system comprising:

chameleon commitment producing means for producing a chameleon commitment based on the public key of said verifier sub-system, a first arbitrary random number of said sender sub-system, first data producing means for producing first partial verification data based on the public key and a second arbitrary random number of said sender sub-system, a challenge producing means for producing a challenge based on said chameleon commitment and said first partial verification data, and second data producing means for producing second partial verification data based on said challenge and the secret key of said sender sub-system, and said verification data producing means sends said chameleon commitment, said first partial verification data, said second partial verification data and the value of said second arbitrary random number used in the production of said chameleon data, as verification data, to said verifier sub-system, and said data verifying means of said verifier sub-system comprising:

chameleon commitment restoring means for restoring a random number bit based on the public key of said verifier sub-system, and said chameleon commitment and said second arbitrary random number value included in said received authorization data, challenge restoring means for restoring said challenge based on said restored random number bit, said chameleon commitment, and said first partial authorization data, and data ascertaining means for verifying said signature data based on said restored challenge, said first and second partial authorization data and the public key of said sender sub-system.

\* \* \* \* \*